Dec. 5, 1961 — A. B. WILSON — 3,011,316
BREAKWATER AND METHOD OF DISSIPATING WAVES
Filed Dec. 18, 1958 — 4 Sheets-Sheet 1

INVENTOR.
Allen B. Wilson,
BY Pringley, Baird, Clayton, Miller & Vogel
Attys.

United States Patent Office 3,011,316
Patented Dec. 5, 1961

3,011,316
BREAKWATER AND METHOD OF
DISSIPATING WAVES
Allen B. Wilson, 1416 N. State Parkway, Chicago, Ill.
Filed Dec. 18, 1958, Ser. No. 781,251
21 Claims. (Cl. 61—4)

This invention relates to improvements in breakwaters and methods of dissipating wave action along the shores of various bodies of water where the waves have a normal tendency to wash away the earth and destroy the shore line and to interfere with the movement and docking of ships, and the present application is a continuation-in-part of my copending application, Serial No. 495,620, filed March 21, 1955 and now abandoned.

It is well known that, although waves created by the passage of wind over water appear to involve a progressive linear movement of the water with the wind at and adjacent to the water surface, each wave is in fact manifested by a local circulation or oscillation of particles of water substantially in vertical planes in closed circuits. Thus, successive waves in a series of advancing waves are made up of different groups of water particles moving in separate local circuits of oscillation, each circuit of oscillation being roughly of elliptical shape so that, broadly speaking, each particle of water at a particular location in a body of water moves through an elliptical path as a wave passes through that location. As the shore is approached, the particles of water in the lower parts of the local circuits of oscillation in a wave are retarded by contact with the bottom and the result is that the wave curls over in a forward direction to form a breaker and the water in the lower part of the wave circuit washes away the earth. With a strong wind and large waves the erosion may be rapid and extensive. The use of a breakwater is therefore very important in many coastal regions, not only to minimize the erosion caused by the waves but also for the more important purpose of insuring calm water for the protection of ships and harbors.

The amount of energy necessary to be dissipated in the dampening and arresting of waves in a large body of water often is almost unbelievably great, and many articles have been written in the past about the forces produced by waves and the difficulties involved in building ordinary breakwater structures of sufficient mass and secure foundation to withstand these forces. It is a well known fact, for example, that sections of ordinary stone, steel and concrete breakwaters weighing more than 1,000 tons have been moved by the forces produced by waves. An interesting but brief article on this subject may be found, for example, in the 1955 edition of Encyclopaedia Britannica, volume 4, at pages 68 to 70, where it is pointed out that the force exerted by waves against one masonry breakwater was calculated to have been two tons per square foot. It will readily be appreciated, therefore, that ordinary breakwater structures—which, in effect, are nothing more than blank walls upon which the waves impinge—must be very massive in order to withstand these forces. This has been the case with previously known breakwater structures because the wave energy in each case has been dissipated largely by the brutal impact of the waves upon the breakwater wall. Because of the hugh masses and great strength necessary in breakwaters of previously known types, the prior breakwater structures often have been extremely expensive to build and have often required years of construction effort. For example, an advance of 150 or 200 feet in the length of one of the massive breakwater structures during the course of a season's work is often regarded as satisfactory.

The present invention involves the discovery that the damaging and disturbing effect of waves may be reduced and eliminated by arresting the cyclical action of the water in the waves and causing them to absorb their own energy, rather than causing them to strike a solid body as has been the case in previously known breakwater structures. In the present structure and method, the circuit of oscillation referred to above is interrupted and the forces caused to dissipate themselves in turbulence, rather than by impact upon a solid body. This result is preferably accomplished in accordance with the present invention by causing the waves to enter a chamber within which the wave action is dissipated by the turbulence of the water in the chamber. More particularly, the invention contemplataes the use of a chamber formed by spaced walls which are alternately more permeable to the movement of the water in opposite directions so that the incoming waves enter the chamber through one wall and are then arrested by the turbulence of the water in the chamber and by the other wall and their circulatory action thereby dampened and dissipated, so that the water between the breakwater and the shore is in a more or less quiescent state. It has been discovered that the efficiency with which a series of identical waves may be dampened and their energy dissipated in accordance with the present invention, increases with an increase in the degree of turbulence created in the chamber. Thus, one of the important further features of the present invention is to cause the waves entering the chamber to produce greater turbulence therein than would ordinarily be created by mere entrapment of the waves within the chamber. Still another object is to provide a breakwater structure that will effectively dampen and dissipate waves in both directions with respect to the breakwater—that is, both waves that travel toward the shore and those that travel away from the shore. Yet another object of the invention is to provide a breakwater structure and method which may be employed without seriously obstructing the normal water currents that may exist in the area of installation, thereby permitting the breakwater to be installed, for example outwardly of the mouth of a river where the normal currents would be in a direction off-shore, or in an area where the in-shore and off-shore currents caused by tides are substantial. Still another object of the invention is to provide a highly improved breakwater structure having the foregoing qualities but which may easily and quickly be installed and which is far less expensive than previously known breakwaters of comparative effectiveness.

The invention may be embodied, in one of its forms, in parallel walls spaced apart to form an intervening chamber and comprising pivoted vanes on each wall which are movable only into said chamber, so that one series of vanes permits the passage of water primarily in one direction, while the other series permits the flow of water primarily in the opposite direction, whereby incoming waves pass between the vanes of one wall and are caused to be dampened by the turbulence of the water in the chamber. The invention may be embodied in other forms, as more fully explained below, wherein the seaward wall through which the incoming waves pass into the chamber, for example, is provided with means for increasing the turbulence within the chamber. In still other forms of the invention the seaward wall, in addition to having means for increasing the turbulence within the chamber, may be constructed in such a manner as to provide relatively free flow of water out of the chamber in the seaward direction, thereby avoiding any substantial tendency for the water level within the chamber to be built up by successive waves. The invention further contemplates the provision of a breakwater comprising spaced walls and an intervening chamber, each wall being made up of a plurality of sections detachably mounted between successive posts driven into the earth and made up of pivoted vanes which are capable of being opened only toward the shore in one wall and only away from the shore in the other wall. Other objects, features and advantages of the invention will appear more fully hereinafter.

The nature of the invention will be understood from the following specification taken with the accompanying drawings in which one embodiment of the invention and modifications of certain features thereof are illustrated.

Figure 1:
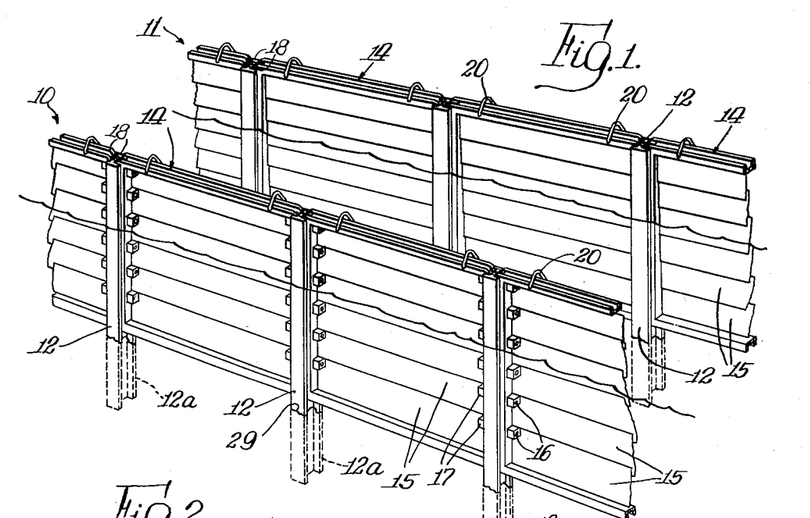
FIG. 1 shows a perspective view of a portion of a breakwater embodying the features of the present invention, wherein the spaced walls are in parallel planes.
Figure 2:
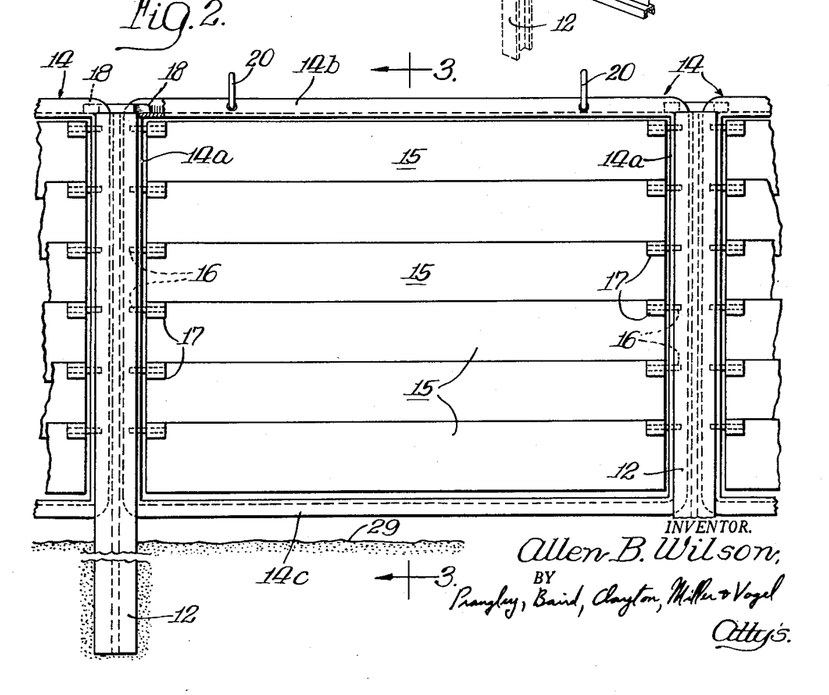
FIG. 2 shows a side elevation of the breakwater illustrated in FIG. 1.
Figures 3, 4, 7, 8:
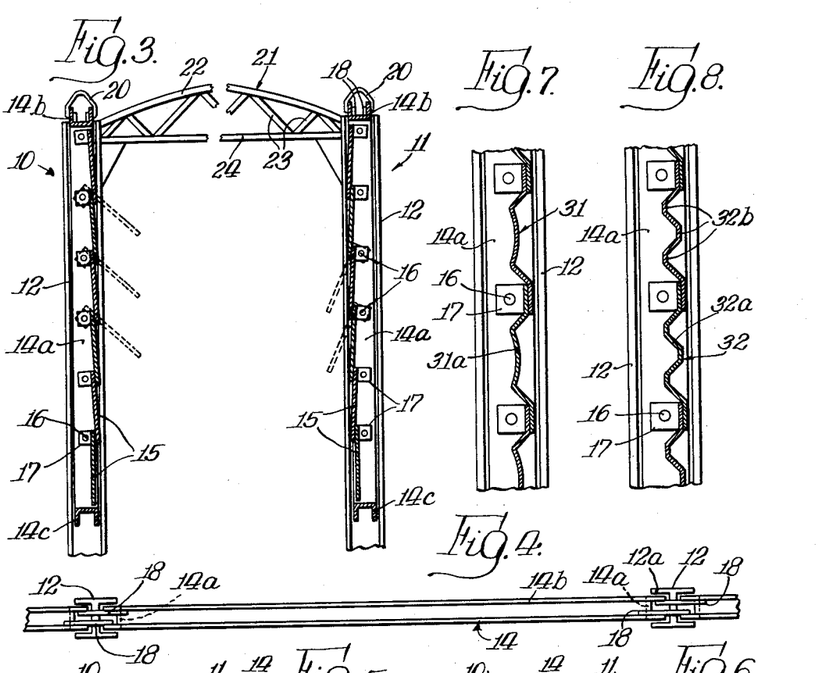
FIG. 3 shows a transverse vertical section taken on the line 3—3 of FIG. 2, with the addition of a truss structure for connecting the top ends of opposite posts.
FIG. 4 shows a top plan view of one of the walls of the breakwater illustrated in FIG. 3.
FIG. 7 shows an enlarged vertical section through a portion of a breakwater wall illustrating a modified cross-sectional form of the vanes.
FIG. 8 is a vertical section similar to that of FIG. 7 illustrating still another form of the vanes.

The form of the invention showing particularly in FIGS. 1, 2 and 3 comprises two walls 10 and 11 which extend parallel to each other and which are mounted along the shore some distance outwardly from the water's edge so that they will be subjected to the normal wave action when a substantial wind is blowing. Each wall comprises a series of equally spaced posts or piles 12 which are preferably of H-shape cross section and which are driven into the sand or other earth of the shore in such a manner that the posts of each wall are parallel to each other and in the same plane. The posts of one wall are preferably in a plane parallel to the plane of the posts of the other wall, as shown in FIGS. 1 and 3, so that the two walls 10 and 11 are located in parallel vertical planes, but it may be desirable in some instances to drive the posts so that the walls converge upwardly. The posts 12 are driven so that the flanges 12a of each post are directed toward these flanges of the next adjacent posts and these flanges are adapted to receive between them the rectangular frames or panels 14 each of which carries a series of pivoted vanes 15 which may be in the form of flat plates. The frames 14 are rectangular in form and are preferably formed of channel bars having their flanges directed outwardly. Each frame or panel has opposite end members 14a, a top member 14b, and a bottom member 14c. The webs of the channels of the end frames 14a are apertured for pivotal engagement by rods 16 which are welded in apertures in blocks or hinges 17. These blocks are welded to the upper end portions of the vanes 15 in proximity to the end members 14a of the frames so that the vanes 15 are held against endwise movement and are permitted to tilt inwardly about their top edges as shown in FIG. 3. The lower edge of each vane extends downwardly on the inner side of the top edge of the next lower vane and in proximity thereto so that each vane is capable of opening only in one direction.

In order to support the frames or panels 14, the top member 14b of each panel has welded thereto at its ends a lug 18 which overlaps the web of the adjacent post 12 so that the top edge of the frame or panel is maintained substantially in line with the tops of the posts 12. The lugs 18 on one frame are offset laterally with respect to the lugs of the next adjacent frame so that they do not overlap each other above the webs of the posts 12. When the posts 12 are initially driven into the sand or other earth of the shore, they are driven until their top ends are substantially in line with each other and, if this cannot be readily accomplished, the tops of the posts are cut off so that their top ends lie substantially in the same horizontal plane. To permit the frames or panels 14 to be moved into and out of engagement with the flanges of the posts 12, the top frame members 14b of the panels are provided with rings or eyelets 20 which may be engaged by the hooks of a crane or other hoist. The top ends of the posts 12 of the opposite walls 10 and 11 may be connected by truss structures 21 as shown in FIG. 3 so that the top portions of the two walls are maintained against separation. Each truss structure may comprise an arch shaped member 22 connected by diagonal braces 23 with a lower transverse member 24.

Figure 5:
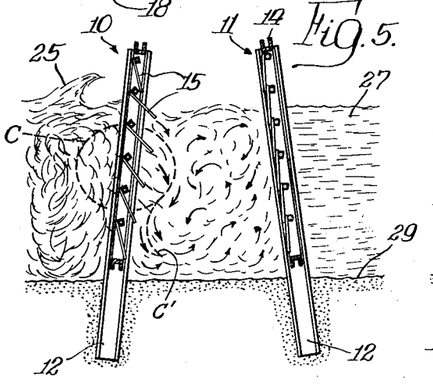
FIG. 5 is a vertical section through the breakwater similar to that of FIG. 3 but illustrating the walls as being relatively inclined and showing the action of the waves on the vanes of one wall of the breakwater as they move inwardly toward the shore, the vanes of the other wall being then closed.
Figure 6:
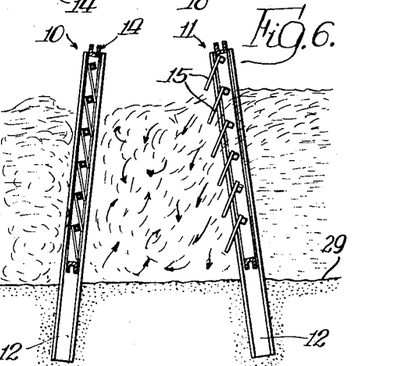
FIG. 6 is a sectional view similar to that of FIG. 5 showing the action of the water on the vanes of the wall nearer the shore as the wave action is dissipated by the turbulence of the water between the walls and a quiescent condition is created between the inner wall and the shore.

With the parallel walls 10 and 11 constructed and arranged as described above, their action upon the water may be substantially as illustrated in FIGS. 5 and 6, which show a modification of the breakwater in which the walls converge upwardly. With this arrangement the edges of adjacent vanes of each wall, because they will normally hang vertically, are spaced slightly apart when there is no motion of the water. As stated above, the energy in a wave is manifested by a cyclic movement of the particles of water in more or less elliptical circuits. One of the circuits, designed by the letter C, has been shown schematically and representatively by broken lines in FIG. 5 in order to permit a more full explanation of how it is believed the breakwater functions to dissipate the wave energy. In viewing FIG. 5, and particularly the representative cyclic path C therein, it should be kept in mind that when the waves 25 are moving from the left to the right in that figure, the particle or particles of water that would ordinarily trace the path C will be moving in the clockwise direction therein. Thus, as a wave reaches the position represented by the cyclic path C, the water particle or particles at the top of the path, and in adjacent paths, will impinge upon the upper vanes 15 of the wall 10 and cause these vanes to swing inwardly so that the particles (and the mass of water that they collectively comprise) will pass freely between the upper vanes and into the chamber. The tendency is for the particles of water to complete their cycle. Thus, the particles of water that would ordinarily trace the cycle C and the multitude of similar cycles will try to leave the chamber between the walls 10 and 11 in the path represented schematically and representatively by the bottom portion of the cycle C. In attempting to follow this path, the water particles impinge upon the lower vanes 15. These latter vanes are thus moved to the closed position and deflect the water therefrom generally in the direction of the line C' so that a very heavy and vigorous turbulent condition is produced within the chamber, as shown by the arrows in FIG. 5. The wave energy—that is, the kinetic energy possessed by the particles of water—is thereupon dissipated primarily in the impact and collision of one particle against another, rather than by the impact of the particles upon the walls of the chamber themselves. The water particles of the next oncoming wave, of course, impinge upon this body of turbulent water and produce further turbulence in the manner just described, whereupon the energy of the second wave is dissipated. Most of the forces exerted upon the structure itself are from the turbulence that takes place within the chamber and are directed outwardly in both directions so that, particularly when the walls 10 and 11 are tied together, as shown for example in FIG. 3, there is little tendency for either wall to topple. The structure may therefore be relatively light in weight, and no massive footings are required. The water of a wave entering the chamber thus has its cycle arrested and dissipated partly by the vanes through which it has just passed which prevent outflow in the bottom of the path of the cycle, and partly by the vanes of the wall 11, which are closed to outward movement from the chamber, but primarily by the turbulent condition of the water in the chamber which interferes with cyclic wave action and causes it to disappear. Each wave is therefore substantially trapped and dissipated between the walls 10 and 11, with the result that the cyclic wave action of the water is substantially removed. At the same time, a build-up of the water level in the chamber is avoided. Rapid leakage of water is permitted through both walls of the chamber by reason of the generous tolerances in the fit between the vanes 15 in both walls 10 and 11.

The water which passes through the wall 11 toward the shore will later move outwardly through the vanes 15 of that wall which open slightly as shown in FIG. 6, but this water which returns toward the turbulence chamber, as shown in FIG. 6, is free of waves and is merely seeking its proper level due to gravity. It is to be noted that no bottom wall per se is provided in the structure for forming the turbulence chamber in the present embodiment, and that the relatively loose fitting vanes in the walls 10 and 11 permits the water within the chamber to leak therefrom relatively rapidly so that the water level within the chamber is maintained substantially at the same level as the water outside the chamber.

It will of course be understood that the wave dissipating action described above will take place between the walls 10 and 11 regardless of whether the waves are moving toward or away from the shore, this being an important feature of the invention particularly when the breakwater is installed with a harbor area.

The vanes 15 may be constructed in the form of flat plates as shown in FIGS. 1 to 6, inclusive, and they are so arranged that the lower edge of one vane overlaps the top edge of the next lower vane within the chamber, so that the vanes of each wall open only in an inward direction. In FIG. 7 there is shown a modification in which a vane 31 is similar to the vane 15 except that it is of channel form and its web 31a is curved transversely, thus giving longitudinal stiffness to the vane. In FIG. 8 there is illustrated another modification in which a vane 32 has its web 32a corrugated to provide a plurality of longitudinal ribs 32b.

Figure 9:
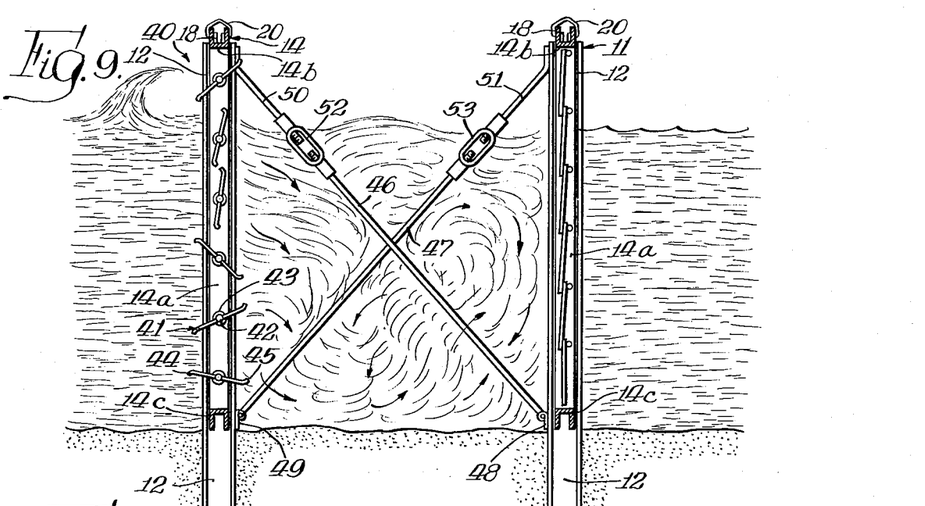
FIG. 9 is a view in transverse vertical section similar to FIG. 3, showing a modified form of vane on the seaward wall for increasing the turbulence in the chamber, and showing a modified reinforcing structure.
Figure 10:
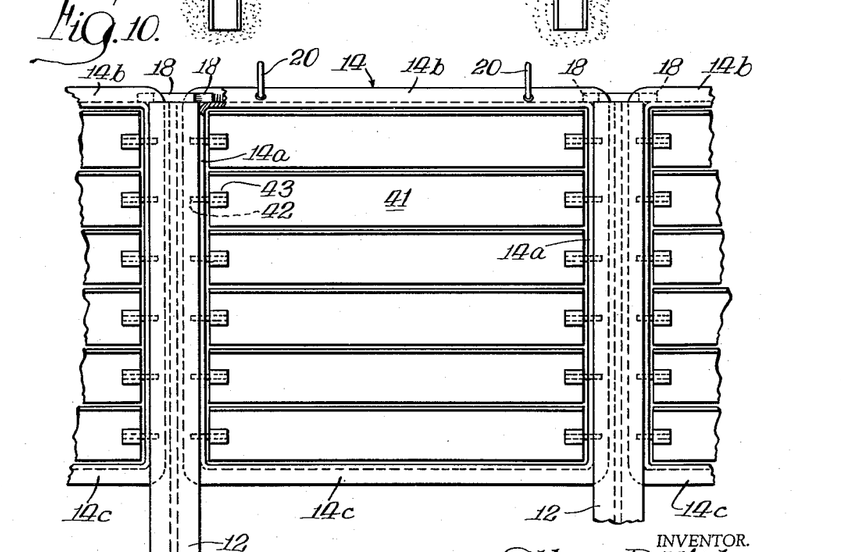
FIG. 10 is a partial plan view of the seaward side of the breakwater of FIG. 9.

In FIGS. 9 and 10 of the drawings, there is shown another modification of the present invention wherein the breakwater comprises two walls 11 and 40 that are arranged parallel to each other and spaced apart to provide a turbulence chamber therebetween. The construction of the wall 11 shown in FIG. 9 is identical to the wall 11 described above with respect to FIGS. 1 and 2 of the drawings. The wall 40 embodies the vertically disposed H-shaped posts 12 and the frames 14, including the vertical frame members 14a and the horizontal frame members 14b and 14c, as described above, and the previously mentioned eyelets 20 and the lugs 18 are also provided on the wall 40 in this form of the invention. The vane structure of the wall 40, however, differs from that of the wall 11 primarily in that a plurality of vanes 41 are provided which are mounted for free rotation about horizontal axes. More specifically, the upright members 41a of the frames 14 of the wall 40 are apertured to rotatably receive short pins or rods 42 which are fixed in any suitable manner in cylindrical blocks 43 that are welded or otherwise secured to the opposite ends of each vane 41. The blocks 43, as illustrated in FIGS. 9 and 10 are disposed so that the axes of the pins 42 are coincident with the longitudinal center line of each vane, thus providing a balanced structure for each vane. Each vane is, or may be, substantially planar over most of its length and width, but the opposite longitudinal edge portions of each vane 41 are curved in opposite directions (see FIG. 9) so that any flow of water through the wall 40 will tend to cause the vanes to rotate.

The wall 40 ordinarily is positioned on the seaward side of the breakwater or on the side from which the larger waves approach. Due to the mounting of the vanes 41 along their center lines, and further due to the fact that the edges of adjacent vanes are clear and do not overlap, it will be appreciated that a wave passing through the wall 40 and into the turbulence chamber between that wall and the wall 11 will cause the vanes 41 to rotate. This rotation of the vanes produced vigorous turbulence in the body of the wave as it passes through the wall 40 and adds materially to the turbulence otherwise produced within the turbulence chamber between the two walls. Since it is the wave force itself which produces the rotation of the vanes 41, it will be appreciated that it is this force which is transformed into turbulent energy by the rotation of the vanes. This turbulent energy quickly dissipates itself, however, in the tumult and agitation that takes place in the turbulence chamber, and the force of the wave is thus quickly dampened and dissipated.

At certain times, and particularly when the body of a wave is passing through the wall 40, all of the vanes 41 subjected to the actual body of the wave will be rotating in the same direction, while the lower vanes may be rotating in the same or in the opposite direction, depending upon the currents existing at that particular moment in the area of the lower part of the wall 40. In any event, because the vanes 41 are individually mounted and each is free to rotate independently of the others, the vanes 41, while creating increased turbulence in wave bodies entering the turbulence chamber, also permit a flow of water out of the turbulence chamber at a rapid rate in the seaward direction. This prevents any substantial build-up of the water level in the turbulence chamber and further increases the rate at which the energies in the chamber are dissipated. As in the case of the structures shown in FIGS. 1 to 6, any build-up of water on the shore side of the breakwater of FIGS. 9 and 10 may quickly flow in the seaward direction through the breakwater structure, the vanes in the wall 11 opening to permit this flow as shown in FIG. 6. Thus, the breakwater of FIGS. 9 and 10 avoids any accumulation of water on its shore side from successive waves approaching from the seaward side and, if desired, the structure may actually be installed offshore opposite the outlet of a stream or the like where the normal water currents run in the seaward direction. Such seawardly moving currents, it will be observed, will lift or open the vanes of the wall 11 and they will, of course, flow without obstruction through the wall 40.

A modified structure for reinforcing the two walls 40 and 11 is illustrated in FIG. 9. As there shown, a tie rod 46 extends diagonally upwardly from the lower portion of each upright post 12 of the inner wall 11, the lower end of each rod 46 being pivotally attached by a bracket 48 to its respective post 12. The upper end of the rod 46 is threaded and receives one end of a turnbuckle 52, the other end of which is threaded upon a rod 50 that is secured to the upper end of the adjacent post 12 of the wall 40. Similarly, a tie rod 47 is pivotally secured to the lower end portion of the post 12 of the wall 40 by means of a bracket 49, and this tie rod extends upwardly where it is joined by a turnbuckle 53 to a rod 51 secured to the upper end of the post 12 of the wall 11. The rods are tensioned by adjustment of the turnbuckles so as to give strong lateral support for the two walls 11 and 40, thereby providing a very strong and durable, but yet relatively inexpensive, breakwater structure.

Figure 11:
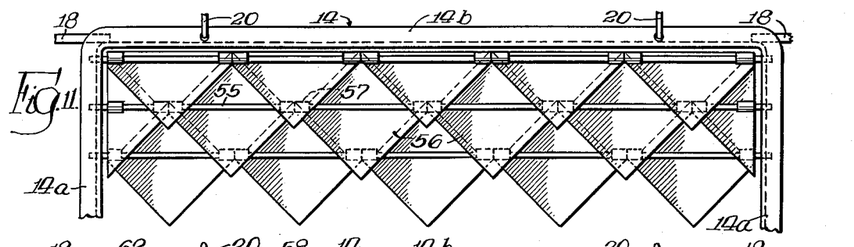
FIG. 11 shows another variation of the vanes of a breakwater made in accordance with the present invention, the vanes being seen from within the chamber of the breakwater and the shape and overlapping relationship of the vanes being such as to increase the turbulence produced as the waves enter the chamber.

In FIG. 11 of the drawings there is shown a modified vane structure which may be employed as a substitute for the vanes 15 of the wall 10 (FIG. 1) or for the vanes 41 of the wall 40 (FIGS. 9 and 10). In this form of the invention, a plurality of spaced parallel rods 55 are provided within each frame unit 14, the opposite ends of each rod being secured in the upright end members 14a of the unit 14. A plurality of individual generally rectangular shaped vanes 56 are pivotally suspended from each rod 55 by means of pairs of boss-like bearing members 57 formed integrally at diagonally opposite corners of each vane. The vertical spacing of the rods 55 and the dimensions of the vanes 56 are such that the center of gravity of each vane is below its supporting rod 55 so that each vane will tend to swing to its closed position, and the lower pointed end of each vane overhangs or overlaps the next lower rod 55 and a portion of the vanes below it. In the particular form shown in FIG. 11 the vanes of each row are staggered with respect to those of the next adjacent row so that the lower pointed end of each vane overhangs the adjacent corners of two lower vanes and the lower diagonal edges of each vane overhang the upper diagonal edges of two other vanes. This particular structure has somewhat the same advantages as the structure of FIGS. 9 and 10 in that the configuration of the vanes adds to the turbulence created in the turbulence chamber between the two walls, while at the same time permitting easy leakage of water out of the chamber in the seaward direction.

Figure 12:
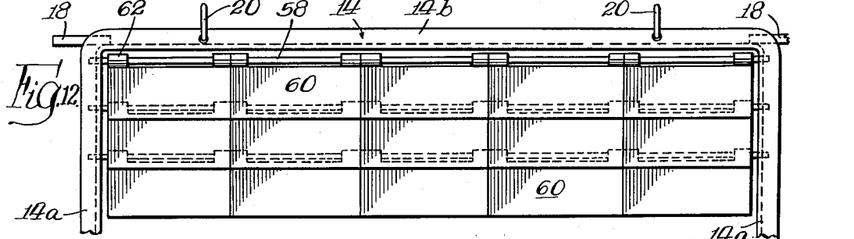
FIG. 12 is a view similar to FIG. 2, but showing a further modification of the vane structure.

A modification of the wall of FIG. 11 is shown in FIG. 12. As seen in FIG. 12, a plurality of horizontal rods 58 are provided in each frame unit 14, the rods preferably being equally spaced apart as is the case with the rods 55 of FIG. 11. Suspended from each of the rods 58 there are a plurality of substantially rectangular vanes 60, the upper edge of each vane 60 being provided with a pair of bearing members 62 through which a support rod 58 extends. The lower edge of each vane 60 overlaps the upper edge of the next lower vane, and all of the vanes are pivotally suspended upon their respective support rods 58 so that they may swing open, as in the case of the vanes of FIGS. 1 and 11, inwardly into the turbulence chamber between the two walls of the breakwater. The wall of FIG. 12 is useful either as the outer seaward wall or as the inner wall of the breakwater structure, and may be used as the outer wall when it is desired that the escape or flow of water out of the turbulence chamber in the seaward direction be relatively slower than that provided by the structures of FIG. 9. This same relatively slow escape rate is provided by the structure of FIG. 1, but the wall of FIG. 12 has an advantage over the wall structure of FIG. 1 in that the vanes 60 are smaller than the vanes 15, and are thus more conveniently manufactured and packed for shipment and are less subject to damage by heavy waves, and the support rods 58, like the rods 55 of FIG. 11, may assist in rigidifying and reinforcing the frame units 14.

Figure 13:
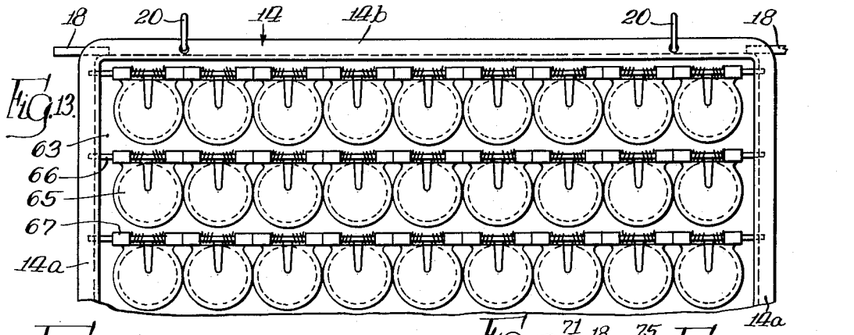
FIG. 13 is a view similar to FIG. 11, showing a still further modification of the vane structure.
Figures 14, 15:
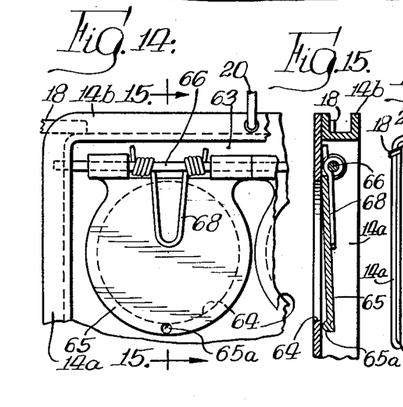
FIG. 14 is an enlarged fragmentary view showing one vane of the form illustrated in FIG. 13 and illustrating, particularly, the cooperation thereof with an apertured plate and the mounting thereof.
FIG. 15 is a view in vertical section through the structure of FIG. 14, substantially as seen in the direction of the arrows along the line 15—15.

Referring now to FIGS. 13, 14 and 15 of the drawings, there is shown a still further modification of the invention wherein the entire area defined by the frame unit 14 is occupied by an apertured plate 63 that is welded or otherwise secured to the frame members of the unit 14. A plurality of circular apertures 64 are formed in the plate 63, the apertures being illustrated as being disposed in aligned horizontal and vertical rows, but it is to be understood that other arrangements of the apertures may be used. Each of the apertures is provided with a cover plate 65 capable of covering the aperture, the various cover plates being pivotally suspended upon horizontally extending supports rods 66 which extend through bearing members 67 formed on the upper edges of the plates 65. The support rods 66 are secured at their opposite ends to the upright frame members 14a of the frame unit 14 and, as illustrated, each cover plate 65 is provided with a spring member 68 coiled upon the adjacent rod 66 and having its opposite ends acting against the plate 63, with an intermediate loop of the spring member acting against the face of the cover plate so as continuously to urge the cover plate toward its closed position, in which position a dimple 65a formed adjacent the lower edge of each cover plate contacts the plate 63 so as to prevent complete closing of the cover plate. A wall of this type, having each frame unit 14 provided with an apertured plate 63 with cover plates 65, is useful on both the seaward side and on the inner or land side of the present breakwater assembly. It has the advantage that a very high degree of turbulence is introduced into the body of a wave as it strikes and opens the cover plates 65 and passes through the apertures of the plates 63 into the turbulence chamber between the two walls. At the same time, the rate of escape of the water from the turbulence chamber may be controlled by varying the size of the dimples 65a and by installing the frame units 14 and their plates 63 so that there is a predetermined space between the lower edge of the plate 63 and the surface of the sand or earth beneath the breakwater wall, it being understood that the plate 63 need not extend downwardly below the depth of the wave motion that is to be dampened or dissipated.

Instead of positioning the vanes for rotation or pivoting movement about horizontal axes, it has been found desirable in certain installations to mount the vanes for pivotal movement about vertical axes. Thus, in FIG. 16 there is shown a form of breakwater wall, for use as the outer or seaward wall in the present invention, wherein each frame unit 14 is provided with a plurality of freely rotatable vanes 69 mounted in any suitable manner to vertical rods 70 which have their upper and lower ends rotatably received in the upper and lower frame members 14b and 14c of a frame unit 14. Each vane 69 resembles the vanes 41 described above (FIGS. 9 and 10) in that they are free to rotate and have their opposite lateral edges curved in opposite directions so that the movement of a wave body through the wall and into the turbulence chamber between the inner and outer walls will cause the vanes to rotate. The rotation of the vanes 69 introduces into the wave body the desirable added turbulence referred to above and aids in the quick dissipation of the wave energy. Thus, the form of the invention shown in FIG. 16 has the advantages described above with respect to the structure shown in FIGS. 9 and 10. It has a further advantage, however, in that when the vanes 69 extend downwardly into the water below the depth of the wave formations, the lower ends of the vanes work against relatively stationary water as they are rotated by the oncoming waves. Thus, the vanes 69 may be caused to absorb a certain amount of the wave energy while at the same time introducing turbulence to the wave bodies.

Figures 16, 17:
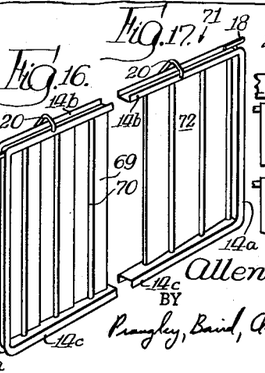
FIG. 16 is a perspective view, on a reduced scale, of another arrangement of vanes wherein the vanes are oriented vertically and are free to revolve with respect to the support frame about a vertical axis.
FIG. 17 is a perspective view, on a reduced scale, of yet another modification wherein the vanes are mounted to pivot on vertical axes and are overlapped.

Another form of breakwater wall for use in the present invention, having vertically oriented vanes, is illustrated in FIG. 17. The fragmentary frame unit 14 there shown represents a portion of a breakwater wall 71 that may be used either as the outer or the inner wall in the present invention. The wall is provided with a plurality of vertically extending vanes 72 which may be of a construction identical to tthe vanes 15 described above (see FIGS. 1 to 6) except that instead of being pivotally mounted at their opposite ends in the upright members 14a and 14b of the frame unit 14, their opposite ends are pivotally mounted in the horizontal frame members 14b and 14c of the frame unit 14. The vanes 72 overlap each other in the same manner as the vanes 15 and operate in the manner described above with respect to the vanes 15. While having all of the advantages of the vanes 15, the vanes 72 have some of the advantages of the vertical, rotatable vanes 69 in that as the oncoming waves open the vanes 72, their lower ends can be caused to work against relatively quiet deep water and thus absorb some of the energy of the waves as the waves move into the turbulence chamber for further and complete dissipation.

Figure 18:
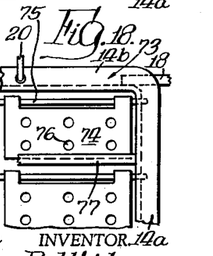
FIG. 18 is a still further modification of the vane structure showing pivoted vanes, the vanes having apertures therein to provide for leakage of water from the associated turbulence chamber.

It has been explained above with respect to the construction of FIG. 11 that it is often desirable to provide for a relatively free and relatively unobstructed flow of water out of the turbulence chamber. A wall structure specifically designed to facilitate such flow has been illustrated in FIG. 18 of the drawings. Referring to that figure, there is shown a wall 73 having a plurality of substantially rectangular vanes 74 that are rotatably suspended from horizontal rods 75 that are similar to the rods 55 of FIG. 11 and the rods 58 of FIG. 12. The wall 73 may be used for either or both walls of the turbulence chamber. Formed in each of the vanes 74 are a plurality of apertures 76 which permit the flow of water therethrough in any position of the vanes. There also are provided on the frame 14 a plurality of abutment bars 77 extending horizontally between the vertical frame members 14a of the frame unit 14 and positioned to be engaged by and abut the lower edge of each vane 74. Thus, unlike the structure illustrated in FIG. 12, the individual vanes 74 of the structure shown in FIG. 18 are provided with a plurality of apertures 76 which will permit a flow of water through the vanes regardless of the position of the vanes, and instead of overlapping each other, the lower edges of the vanes 74 are adapted to abut the bars 77 which are spaced above the vane support rods 75 so as to provide a space between adjacent horizontal rows of the vanes. The spaces just mentioned between the horizontal rows of the vanes permits a certain amount of water to flow therethrough in both directions, and further flow of water out of the turbulence chamber between pairs of the walls is also provided by the apertures 76 in the vanes. At the same time, the spaces between the rows of vanes and the apertures in the vanes produce added turbulence in the bodies of waves moving through the wall and into the turbulence chamber.

The breakwater of the present invention may be used with satisfactory results in various locations and under various conditions in order to produce a state of substantially quiet water, thereby substantially reducing damage from the waves and producing a state of quiet water to facilitate the anchoring and docking of ships in harbors and other waterways. It may be used in each instance in the same way as an ordinary breakwater and, as pointed out above, it can be used within a harbor to dampen waves from all directions. The dimensions of the breakwater and its distance from the shore will vary greatly depending upon the depth of the water and the results which are desired. For illustration, if the water has a depth of twenty or thirty feet, the two walls of the breakwater would preferably be located about forty or fifty feet apart. If heavy wave action is expected the top ends of the opposite posts should preferably be connected by a truss structure or the like.

The breakwater of the present invention is preferably used in relatively deep water—that is, outwardly beyond the normal line at which breakers would normally occur—and it will be observed that the present invention does not dissipate the force of waves by causing breakers to form. On the contrary, the present breakwater obstructs off-shore the cyclical returning movement of water within the body of each advancing wave so as to create an area of turbulent water within which the energy of each advancing wave is dissipated. Referring again to FIG. 5 and the representative normal cyclical motion of water particles schematically illustrated by the path C in that figure, it will be noted that force of the cyclical returning movement of the water (the movement that would normally occur in the lower portion of the path C) is diverted and utilized to create an area of turbulent water wherein the forces dissipate themselves. Thus, it should be noted that the forces are not dissipated by impact against an upright wall in the way that waves are broken up when they strike an ordinary breakwater wall. The wall on the seaward side of the present structure offers no such impact wall because the vanes therein are readily opened to admit the waves into the chamber between the walls. The admitted waves, on the other hand, likewise do not impact against the second wall because their forces are diverted to a condition of turbulence before they can strike the second wall, and the turbulent body of water also forms a cushion ahead of the second wall. Thus, all damaging and shocking impacts of the type that are present in the use of ordinary breakwaters are avoided in the present structure, with the result that the present structure may be relatively light in weight and is relatively inexpensive to build and install.

It has been stated previously herein that the vanes in the several embodiments of the invention fit loosely so that the water may leak rapidly from the turbulence chamber through both walls. This is of importance, for one of the objects to be achieved with each of the embodiments is to avoid building up a head of water in the turbulence area between the two walls. That is, the water in the turbulence chamber is maintained at substantially the same level as the water outside the chamber. The need for this will be readily understood, for it will be apparent that if a head of water were permitted to accumulate between the two walls, this head of water would itself tend to act as a wall and, particularly in embodiments of the invention such as those shown in FIGS. 1 to 8, 11 to 15, 17 and 18, would tend to hold the vanes closed in the wall 10 or 11 that is on the seaward side. This would tend to cause the oncoming waves to impact against against the seaward wall and would also tend to cause undesirable waves to be formed by reflection against that wall.

Another of the important advantages of the present breakwater construction and method is that the breakwater acts to dissipate the force of waves that may approach the structure in either direction toward its walls. It is quite common in many harbor areas, for example, for off-shore winds to create very sizable waves that travel in a direction away from the shore and create the same general problems within a harbor area as those waves that travel toward the shore. The present breakwater construction dissipates all of these waves with equal ease, and in the present application when one of the breakwater walls is referred to as the "seaward" wall, it may be either of the walls, depending upon the direction from which the waves are approaching. Accordingly, the present breakwater construction may be used to advantage not only as the outermost boundary breakwater for a harbor area, but also within a harbor area for the purpose of causing waves to subside which travel in a direction off-shore, or in any other direction. In this connection it will be appreciated that the presence of the vanes in both walls of the present breakwater is important, for a solid or blank wall construction in any one of the two walls would reduce the effectiveness of the breakwater. Such a solid wall would be subject to destruction by waves approaching that particular side of the breakwater and such a wall would produce undesirable reflected waves from those waves that strike it.

Another advantage of the present structure, mentioned previously, is that because of the ease with which water will leak or pass through the walls of the breakwater from the turbulence chamber, the breakwater structure may be installed in areas subject to natural underwater currents without substantially changing the flow of these currents. Thus, the present structure may be installed, for example, opposite the mouth of a river without producing a substantial change in the current patterns in the area, and similarly the structure may be installed in areas where the currents caused by tides are substantial. Ordinary breakwater structures, or any other breakwater that comprises a solid wall construction, would block such currents and cause the currents to sweep around the ends of the breakwater. For this reason, it has heretofore been considered impractical to install breakwater structures of previously known types in areas of strong currents. With the present breakwater, however, the installation may easily be made in areas of this kind since the flow of water caused by these currents will seep or move through the breakwater walls without serious interference.

Although certain embodiments of the invention and modifications of certain features thereof have been shown and described by way of illustration, it will be understood that the construction of the breakwaters and the methods of dissipating wave action may be modified in various ways without departing from the scope of the appended claims.

I claim:

1. A breakwater comprising a pair of elongated spaced-apart walls defining a chamber located off-shore and beyond the breaker line in the path of movement of the waves in a body of water, each of said walls having a plurality of openings therethrough, and vanes pivotally mounted in said openings for controlling the passage of water through said openings, said vanes being mounted for opening only in an inward direction into the chamber.

2. A breakwater comprising a pair of elongated spaced-apart walls disposed in the path of movement of the waves in a body of water and forming between them a turbulence chamber, said walls including horizontal vanes pivotally suspended therein which open only inwardly to permit the entrance of said waves into said chamber, said vanes in the wall opposite that through which the waves enter said chamber being adapted to be closed by the turbulence of the water in said chamber.

3. A breakwater comprising a pair of elongated spaced-apart walls disposed in the path of movement of the waves in a body of water, said walls extending upwardly substantially parallel to each other and defining a chamber therebetween, each of said walls including a series of pivoted suspended vanes overlapping each other, said vanes in each wall being mounted for opening only inwardly toward the other wall and inwardly of the chamber, whereby waves may enter through either wall into the chamber between said walls.

4. A breakwater comprising a pair of elongated spaced-apart walls disposed in the path of movement of the waves in a body of water, said walls being inclined upwardly toward each other, each of said walls including a series of pivoted suspended vanes overlapping each other and mounted normally to hang with their overlapping edges spaced apart, said vanes in each wall opening only inwardly toward the other wall, whereby waves may enter through one wall into the space between said walls, said vanes in the other wall being adapted to resist the flow of water through said other wall outwardly from said space.

5. A breakwater comprising a pair of elongated spaced-apart walls disposed in the path of movement of the waves in a body of water, each wall including a series of parallel pivoted vanes which overlap and which open only in an inward direction toward the opposite wall, said vanes in one wall being adapted to permit the entrance of waves into the chamber between said walls, said vanes in the other wall being adapted to repel the surge of water created by the turbulence of the water in said chamber.

6. A breakwater comprising a pair of elongated spaced-apart walls, each of said walls including a plurality of upstanding spaced posts of H-beam form resting on the bed of a body of water with the flanges of adjacent posts directed toward each other, a plurality of rectangular frames formed of channel members having their flanges directed outwardly, the flanges at the ends of each of said frames having a sliding engagement with the flanges of a pair of said posts, and vanes pivotally mounted on and extending between the ends of each of said frames.

7. A breakwater comprising a pair of elongated spaced-apart walls, each of said walls including a plurality of upstanding spaced posts of H-beam form resting on the bed of a body of water with the flanges of adjacent posts directed toward each other, a plurality of rectangular frames formed of channel members having their flanges directed outwardly, the flanges at the ends of each of said frames having a sliding engagement with the flanges of a pair of said posts, and horizontal vanes pivotally mounted at their upper edges on and extending between the ends of each of said frames, the lower edge of each vane overlapping the top edge of the next lower vane.

8. A breakwater comprising a pair of elongated spaced-apart walls, each of said walls including a plurality of upstanding spaced posts resting on the bed of a body of water, each of said posts having flanges thereon directed toward a next adjacent post, a frame mounted between each pair of said posts and slidably engaging said flanges thereof, parallel vanes pivotally suspended in each of said frames, and lugs secured to said frames and overlapping the upper ends of said pairs of posts to support said frames on said upper ends of said pairs.

9. A breakwater comprising a pair of elongated spaced-apart walls disposed in the path of movement of the waves in a body of water and forming between them a turbulence chamber, said walls including horizontal vanes pivotally suspended therein and opening only inwardly to permit the entrance of said waves into said chamber, said vanes in the wall opposite that through which the waves enter said chamber being adapted to be closed partially by the turbulence of the water in said chamber and partially by the waves entering said chamber.

10. A breakwater comprising a pair of elongated spaced-apart walls substantially submerged in a deep body of water in the path of movement of waves in the body of water and forming between them a turbulence chamber, at least one of said walls including a plurality of vanes pivotally mounted therein for free rotation about their axes, said vanes being so shaped and constructed as to be rotated by the body of a wave and to create turbulence in said body as the wave moves past said vanes and into said turbulence chamber.

11. A breakwater comprising a pair of elongated body of water in the path of movement of waves in the body of water and forming between them a turbulence chamber, at least one of said walls including a plurality of vanes pivotally mounted therein for free rotation about vertical axes, said vanes being so shaped and constructed as to be rotated by the body of a wave and to create turbulence in said body as the wave moves past said vanes and into said turbulence chamber.

12. A breakwater comprising a pair of elongated spaced-apart walls substantially submerged in a deep body of water in the path of movement of waves in the body of water and forming between them a turbulence chamber, each of said walls including vanes pivotally mounted therein and mounted to open only inwardly to permit the entrance of the waves into said chamber, said vanes in the wall opposite that through which the waves enter said chamber being adapted to be closed by the turbulence of the water in said chamber, the vanes in at least one of said walls being positioned for pivoting about substantially vertical axes.

13. A breakwater comprising a pair of elongated spaced-apart walls disposed in the path of movement of waves in a body of water and forming between them a turbulence chamber, at least one of said walls having therein an open upright frame, and a plurality of individual generally rectangularly shaped vanes pivotally mounted in side-by-side position in a row across said frame on an axis which traverses diagonally opposite corners of each of said vanes, said vanes being mounted to swing only inwardly with respect to said chamber to permit the entrance of waves into the chamber.

14. A breakwater comprising a pair of elongated spaced-apart walls disposed in the path of movement of waves in a body of water and forming between them a turbulence chamber, at least one of said walls having therein an open upright frame, and a plurality of rows of individual pivotally mounted substantially rectangularly shaped vanes extending across said frame, each of said vanes being pivotally mounted about an axis extending substantially across diagonally opposite corners of the vane, said vanes being mounted to swing only inwardly with respect to said chamber to permit the entrance of waves into the chamber.

15. A breakwater comprising a pair of elongated spaced-apart walls disposed in the path of movement of waves in a body of water and forming between them a turbulence chamber, at least one of said walls having therein an open upright frame, a plurality of parallel spaced rods mounted on said frame and extending across the opening thereof, and a plurality of individual vanes pivotally suspended on each of said rods and mounted to swing only inwardly with respect to said chamber to permit the entrance of waves into said chamber.

16. A breakwater comprising a pair of elongated spaced-apart walls disposed in the path of movement of waves in a body of water and forming between them a turbulence chamber, at least one of said walls having therein an open upright frame, a plurality of parallel spaced rods mounted on said frame and extending across the opening thereof, and a plurality of individual vanes pivotally suspended on each of said rods and mounted to swing only inwardly with respect to said chamber to permit the entrance of waves into said chamber, each of said vanes having apertures therein through which water may flow through the vanes and outwardly of said chamber.

17. A breakwater comprising a pair of elongated spaced-apart walls disposed in the path of movement of waves in a body of water and forming between them a turbulence chamber, at least one of said walls having therein an open upright frame, a plurality of parallel spaced rods mounted on said frame and extending across the opening thereof, a plurality of individual vanes pivotally mounted in a row on each of said rods, and an abutment bar mounted on said frame adjacent each row of said vanes and positioned to be contacted by the free edges of the vanes in that row to permit pivoting of said vanes only in a direction away from said abutment bar.

18. A breakwater comprising a pair of elongated spaced-apart walls disposed in the path of movement of the waves in a body of water and forming between them a turbulence chamber, said walls including vanes pivotally mounted therein and mounted to open only inwardly to permit the entrance of the waves into said chamber, said vanes in the wall opposite that through which the waves enter said chamber being adapted to be closed by the turbulence of the water in said chamber, and resilient means for constantly urging said vanes toward their closed position.

19. The method of causing waves in a body of water to subside which comprises the steps of causing each wave in its entirety and throughout a major portion of its wave depth to impinge in deep water upon turbulent water in a chamber and thereby be dissipated, and maintaining the water level in said chamber at substantially the same level as the water outside said chamber.

20. The method of causing waves in a body of water to subside which consists in placing in the path of the waves in deep water a chamber having closures which are adapted to open only inwardly into said chamber to admit the waves in their entirety and throughout a major portion of their wave depth into said chamber, and maintaining the water level in said chamber at substantially the same level as the water outside said chamber.

21. The method of causing waves in a body of water to subside which consists in placing in the path of the waves in deep water a chamber having opposite walls each comprising pivoted vanes which are adapted to open only inwardly of said chamber, and causing the waves in their entirety and throughout a major portion of their wave depth to impinge upon turbulent water in the chamber.

References Cited in the file of this patent

UNITED STATES PATENTS

| | | |
|---|---|---|
| 226,772 | Mueller | Apr. 20, 1880 |
| 526,082 | Merritt | Sept. 18, 1894 |
| 1,192,141 | White | July 25, 1916 |
| 2,210,264 | Schenk | Aug. 6, 1940 |
| 2,474,786 | Humphrey | June 28, 1949 |
| 2,710,505 | Magill | June 14, 1955 |

FOREIGN PATENTS

| | | |
|---|---|---|
| 8,306 | Great Britain | Apr. 3, 1911 |
| 160,988 | Switzerland | June 16, 1933 |
| 681,210 | Germany | Sept. 18, 1939 |
| 676,082 | Great Britain | July 23, 1952 |

UNITED STATES PATENT OFFICE

CERTIFICATE OF CORRECTION

Patent No. 3,011,316           December 5, 1961

Allen B. Wilson

It is hereby certified that error appears in the above numbered patent requiring correction and that the said Letters Patent should read as corrected below.

Column 13, line 1, after "elongated" insert -- spaced-apart walls substantially submerged in a deep --.

Signed and sealed this 8th day of May 1962.

(SEAL)
Attest:

ERNEST W. SWIDER
Attesting Officer

DAVID L. LADD
Commissioner of Patents